(12) United States Patent
Scheiding et al.

(10) Patent No.: US 9,296,161 B2
(45) Date of Patent: Mar. 29, 2016

(54) METHOD FOR PRODUCING AN OPTICAL ASSEMBLY HAVING AT LEAST TWO OPTICAL FUNCTIONAL SURFACES, AN OPTICAL DEVICE AND UNIT FOR CARRYING OUT THE METHOD

(75) Inventors: Sebastian Scheiding, Jena (DE); Stefan Risse, Jena (DE); Andreas Gebhardt, Apolda (DE); Christoph Damm, Jena (DE); Thomas Peschel, Jena (DE); Ralf Steinkopf, Jena (DE)

(73) Assignees: Fraunhofer-Gesellschaft zur Förderung der angewandten Forschung e.V. (DE); Friedrich-Schiller-Universität Jena (DE)

( * ) Notice: Subject to any disclaimer, the term of this patent is extended or adjusted under 35 U.S.C. 154(b) by 1051 days.

(21) Appl. No.: 13/496,089

(22) PCT Filed: Sep. 13, 2010

(86) PCT No.: PCT/EP2010/005691
§ 371 (c)(1),
(2), (4) Date: May 25, 2012

(87) PCT Pub. No.: WO2011/029634
PCT Pub. Date: Mar. 17, 2011

(65) Prior Publication Data
US 2012/0236400 A1 Sep. 20, 2012

(30) Foreign Application Priority Data
Sep. 14, 2009 (DE) .......................... 10 2009 041 501

(51) Int. Cl.
*B23B 5/00* (2006.01)
*B29D 11/00* (2006.01)
(Continued)

(52) U.S. Cl.
CPC .......... *B29D 11/00596* (2013.01); *G02B 7/182* (2013.01); *G02B 17/0626* (2013.01); *Y10T 82/10* (2015.01)

(58) Field of Classification Search
CPC .............................. G01B 11/002; Y10T 82/10
See application file for complete search history.

(56) References Cited

U.S. PATENT DOCUMENTS

| 4,733,955 A | * | 3/1988 | Cook | 359/859 |
| 4,737,021 A | * | 4/1988 | Korsch | 359/366 |

(Continued)

OTHER PUBLICATIONS

"International Application No. PCT/EP2010/005691, International Preliminary Report on Patentability mailed Mar. 29, 2012", (w/ English Translation of Written Opinion), 17 pgs.

(Continued)

*Primary Examiner* — Will Fridie, Jr.
(74) *Attorney, Agent, or Firm* — Schwegman Lundberg & Woessner, P.A.

(57) ABSTRACT

The invention relates to a method for producing an optical assembly, comprising at least two optical functional surfaces arranged in a fixed positional relationship to one another on a common supporting structure, wherein by means of a processing machine, in various process steps, at least two optical functional surfaces and at least one reference structure having a defined and measurable relative position to the optical functional surfaces are produced. The supporting structure remains rigidly connected to the processing machine until said process steps have been completed, and wherein the optical functional surfaces are then measured relative to the at least one reference structure, and any deviation from a target shape and target position is determined, after which said process steps are repeated at least once with modified actuation of the processing machine. The invention further relates to an optical device comprising an optical assembly produced in this way and to a unit for carrying out such a method.

21 Claims, 4 Drawing Sheets (51) Int. Cl.
*G02B 7/182* (2006.01)
*B23B 5/40* (2006.01)
*G02B 17/06* (2006.01)

(56) References Cited

U.S. PATENT DOCUMENTS

| | | | | |
|---|---|---|---|---|
| 4,938,583 | A | * | 7/1990 | Miller ........................ 351/159.74 |
| 5,862,726 | A | * | 1/1999 | Chan et al. ........................ 82/1.11 |
| 7,209,285 | B1 | * | 4/2007 | Vanstone et al. .............. 359/366 |

OTHER PUBLICATIONS

"International Application No. PCT/EP2010/005691, International Search Report and Written Opinion mailed May 31, 2011", (May 31, 2011), 27 pgs.

Greivenkamp, John E, "Testing aspheric surfaces", Optics and Photonics News, 1(6), (1990), 25-27.

Ohl, R. G, et al., "Design and fabrication of diamond machines, aspheric mirrors for ground-based, near-IR astronomy", Proceedings of the SPIE—The International Society for Optical Engineering SPIE, 4841, (2003), 677-688.

Scheiding, Sebastian, et al., "Ultra-precisely manufactured mirror assemblies with well-defined reference structures", Proceedings of the SPIE—The International Society for Optical Engineering SPIE, 7739, (2010), 773908-1-773908-10.

Steinkopf, R., et al., "Metal mirrors with excellent figure and roughness", Proceedings of the SPIE—The International Society for Optical Engineering SPIE, 7102, (2008), 71020C-1-71020C-12.

Wang, Juwen, et al., "Accelerator Structure Development for NLC/GLC", ICFA Beam Dyn. Newslett. 2003, 10370, (2004), 1-19.

* cited by examiner

METHOD FOR PRODUCING AN OPTICAL ASSEMBLY HAVING AT LEAST TWO OPTICAL FUNCTIONAL SURFACES, AN OPTICAL DEVICE AND UNIT FOR CARRYING OUT THE METHOD

PRIORITY CLAIM TO RELATED APPLICATIONS

This application is a national stage application under 35 U.S.C. §371 of PCT/EP2010/005691, filed Sep. 13, 2010, and published as WO 2011/029634 A2 on Mar. 17, 2011, which claims priority to German Application No. 10 2009 041 501.7, filed Sep. 14, 2009, which applications and publication are incorporated by reference as if reproduced herein and made a part hereof in their entirety, and the benefit of priority of each of which is claimed herein.

TECHNICAL FIELD

The invention relates to a method for manufacturing an optical arrangement with at least two optical functional surfaces which are arranged in a fixed positional relation to one another on a common support structure, as well as to an optical apparatus which comprises such an optical arrangement, and to a device, with which the method may be carried out.

BACKGROUND

Optical arrangements, with which two optical functional surfaces of a defined shape are arranged on a common support structure, are known e.g. from mirror telescopes with folded beam paths, with which the optical functional surfaces are formed by mirrors. The arrangement on a common support structure thereby entails the advantage that a later adjustment of the functional surfaces relative to one another is superfluous and that a misalignment may be ruled out. In particular, if these mirrors are shaped aspherically, however on manufacturing, difficulties arise due to the fact that not only must the functional surfaces in each case obtain an exactly defined shape, but must also be placed and orientated to one another with a likewise high accuracy.

Methods for manufacturing individual optical functional surface known from the state of the art envisage the functional surfaces e.g. being formed from a metal blank in a manufacturing step with a lathe and subsequently measured, wherein the manufacturing step may then be repeated with changed machine parameters, by which means a deviation from an ideal shape which is ascertained on measuring is to be minimised. The deviation from the ideal shape may then be reduced to values in the sub-micrometer region by way of iteration. Thereby however, a position (with regard to the term position, it is always the location and/or orientation which is meant in the present document) of the optical functional surface is not controlled, since the deviation is determined by way of a so-called fitting, by way of a surface defined by the ideal shape being applied over the actually manufactured functional surface, such a best-possible agreement is achieved, and the deviation is then defined as a remaining difference. For this reason, the known method for the manufacture of optical arrangements of the outlined type with more than one functional surface is not practical

SUMMARY

Examples disclosed herein provide a method, with which optical arrangements with at least two optical functional surfaces of a defined shape and which are arranged on a common support structure with a fixed positional relation to one another may be manufactured with an as high as possible accuracy—and specifically with regard to the shape as well as to the relative position of the functional surfaces—and with a low as possible effort, in particular with regard to time. Certain examples develop a device with which such a manufacturing method may be carried out, and suggest an optical apparatus with an optical arrangement of the outlined type, which may be manufactured with accordingly little effort.

Some examples provide a method with the features of the main claim as well as by an optical apparatus with the features of claim 22 and by way of a device with the features of claim 25. Advantageous designs and further developments of the present subject matter are to be deduced from the features of the dependent claims.

With the suggested method for manufacturing an optical arrangement with at least two optical functional surfaces of a defined shape which are arranged in a fixed positional relation to one another on a support structure, firstly in a first process step, by way of a machine tool, a first optical functional surface with a shape defined by an activation of a machine tool is manufactured from a blank which is formed by the support structure or is arranged on the support structure, in a second process step, by way of the machine tool, at least one second optical functional surface with a shape defined by the activation of the machine tool and of a defined relative position to the first functional surface is manufactured from the mentioned blank or a further blank which is arranged in the carrier structure, and in a third process step, by way of the machine tool, at least one reference structure with a defined and measurable relative position to the optical functional surfaces is manufactured on and/or upon the support structure and/or the blank and/or the further blank, wherein the three mentioned process steps are carried out in any temporal sequence or simultaneously and wherein the support structure remains fixed to the machine tool until completion of all these three process steps. The fact that the three process steps are carried out in any sequence or simultaneously, should also include the possibility of them partly overlapping one another with regard to time or being divided into several sub-steps which in turn may also be carried out in a sequence and, under certain circumstances, can be carried out simultaneously to some extent. Subsequently, the shape and position of the at least two optical functional surfaces on the support structure relative to the at least one reference structure is measured in a measurement construction, and a deviation of the optical functional surfaces from a desired shape or desired position which is defined in an exact manner relative to the at least one reference structure, is determined. Thereafter, the mentioned three process steps are repeated at least once with an activation of the machine tool which is changed in a manner such that the mentioned deviation is reduced.

Due to the creation of the at least one reference structure and the fact that this is likewise measured and the deviation relative to this is determined, a reduction of shape errors of the functional surfaces may be achieved with the described iteration, without thereby losing a control of their position. Since the position of both optical functional surfaces—and, as the case may be, of further optical functional surfaces created on the same support structure—is determined in each case relative to the at least one reference structure, thereby a positional relation between the functional surfaces remains under control. Simultaneously with the shape errors, in the described manner, one may therefore also correct an inaccuracy of the relative position of the functional surfaces to one another, so that the optical arrangement may also be manufactured with a very low number of iterations of the three process steps, with an extremely low shape deviation or position deviation. The deviation which is usually still too larger after a first run of the three process steps, may be significantly reduced with the described measures, since this deviation is typically to be led back at least chiefly to errors which are systemic in the context that they would be reproduced with a repetition of the process steps given an unchanged activation of the machine tool.

An optical apparatus of the suggested type, which comprises an optical arrangement which is manufactured or may be manufactured by the described method, may therefore be manufactured with an advantageously small amount of effort with a very high precision, and entails the further advantage that at least the two optical functional surfaces arranged on the common support structure no longer need to be adjusted relative to one another and may thus no longer misalign. With this optical apparatus, it may be the case of a telescope, in particular a mirror telescope with a folded beam path. Other optical arrangements with a beam path folded several times may of course also be manufactured in the described manner.

Typically and accordingly, with regard to at least one of the optical functional surfaces it is the case of a mirror, such as of a mirror with a metallic mirror surface, since such metallic surface may be well machined in the suggested manner. The optical functional surfaces may in each case in particular be at least partly planar, concave, convex or freely shaped, wherein the advantages of the present subject matter come in particular into their own, if at least one of the functional surfaces is created with an aspherical shape, since then additionally to the exact as possible shape, also the exact position of the functional surface relative to the at least one further functional surface is of particular importance for the optical quality of the arrangement.

A device which is suitable for carrying out the suggested method and is therefore advantageous comprises a machine tool for manufacturing the at least two functional surfaces and the at least one reference structure, as well as a measurement device which is arranged separately therefrom or which is integrated into the machine tool, for measuring the functional surfaces and the at least one reference structure, wherein the measurement device is set up with regard to programming technology, to determine the deviation of the optical functional surfaces with respect to a desired shape and desired position, which are defined relative to the at least one reference structure. Additionally, the measurement device with regard to programming technology may be set up to compute corrected setting values for the machine tool, by way of which the deviation may also least be largely compensated with a farther implementation of the process steps. Thereby, it may be advantageous if the determined deviation for this is transformed into a coordinate system defined by deuces of freedom of the machine tool. Measuring in the present document is indicated as an as spatially inclusive and comprehensive as possible evaluation of spatial coordinates of a surface or, in the case of identifiable individual points or lines, as an evaluation of spatial coordinates of these points or of points on the respective line which lie as close as possible.

One may achieve a particularly high accuracy if the determining of the deviation and the subsequent repetition of the three mentioned process steps with a changed activation of the machine tool with the method for manufacturing the optical arrangement is effected several times in a deterministic manner, until the remaining deviation falls below a pre-defined tolerance.

For determining the mentioned deviation, the reference structure and the optical functional surfaces e.g. may be measured in a tactile or interferometric manner or by way of imaging optics. Under certain circumstances, the measurement may cause damage to the functional surfaces, e.g. scratches in the case of a tactile measurement. For this reason, after the last measurement, if an adequate accuracy is ascertained, one may envisage at least the first two process steps being carried out once again such that the functional surfaces come to lie deeper, but the activation of the machine tool otherwise remains unchanged.

With typical embodiments, at least one of the optical functional surfaces which under certain circumstances may also merge into one another without a visible border is designed in a monolithic manner with the support structure. However, it is also possible for the blank, from which the first functional surface is formed, or, inasmuch as the second functional surface is not formed from the same blank, for the further blank, to be fastened on the support structure as a separate part. In this case, one may envisage the blank and/or the further blank only being arranged on the support structure connected to the machine tool, after completion of at least one of the mentioned process steps or at least after its beginning. This in particular applies to cases, in which the further blank, from which the second optical function surface is manufactured, would get in the way when manufacturing the first optical functional surface for example with a turning tool, thus would lie in a working space of the machine tool in the first process step.

In the course of the mentioned process steps, additionally to the optical functional surfaces and the at least one reference structure, one may also manufacture one or more further structures by way of the machine tool, upon and/or on the support structure and/or the blank and/or the further blank, whose deviation from a desired shape and desired position relative to at least one reference structure is likewise determined on measurement. By way of this, the at least one further structure may also be manufactured with optical accuracy.

With regard to the further structure or the further structures, it may e.g. be the case of a bearing-contact structure and/or rest structure for the bearing-contact or for receiving the blank or the further blank on the support structure. By way of this, one may ensure that the optical functional surfaces may also come to lie to one another in an exactly defined positional relation, even if at least one of the functional surfaces is manufactured on a blank which is placed onto the support structure and is releasably connected to this.

Alternatively or additionally, the further structure or one of the further structures may also be a bearing-contact geometry, bearing on which, the support structure may be inserted into an optical apparatus, and by way of which a position of the support structure in the optical apparatus is fixed with respect to at least one degree of freedom, for example all translatory and rotatory degrees of freedom. With this, also one succeeds in a complicated adjustment of the arrangement encompassing the two optical functional surfaces, relative to the other optical components of the optical apparatus becoming superfluous. Thus with embodiments of optical apparatus of the type suggested here and which are particularly advantageous in this respect, a position and orientation of the optical arrangement in the optical apparatus is fixed by at least one bearing-contact geometry which as a further structure of the optical arrangement is manufactured with optical accuracy and with which the optical arrangement bears on a support of the optical apparatus.

With embodiments of the invention, at least one kinematic decoupling is created on and/or in the support structure, which thereby may be designed monolithically with the support structure. Such kinematic decouplings which e.g. may be designed with at least one solid body joint and/or at least one web and/or at least one membrane and/or as a bar system (framework), may in particular be provided between the main body of the support structure and bearing-contact surfaces, with which the support structure is constructed in a manner bearing on a support of an optical apparatus or on a support of one of the optical surface, or at least with a fixed dimensional relation, in order to prevent a deformation of the optical surfaces by way of mechanical stresses.

Typically, the machine tool comprises a turning tool, wherein at least one of the mentioned process steps is carried out by the turning tool. In some examples, the turning tool or the lathe thereby as a cutting element comprises a diamond, by which means the turning tool is particularly suitable for the manufacture of optical functional surfaces from metal blanks. In any case, the two functional surfaces or at least two of the optional functional surfaces may have a common rotation axis, about which the support structure is rotated in the machine tool for manufacturing these functional surfaces.

With the use of a turning tool, one may envisage the support structure before the beginning of the mentioned process steps, being connected to a holder designed as a disk for example—e.g. being cemented onto the disk—and remaining on this holder until completion of the method. This holder may be rotatably arranged on a shaft of the machine tool for rotating the functional surfaces and for other process steps as the case may be. If the measurement device, with which the functional surface and the reference structures are measured, is spatially separated from the machine tool, the support structure then together with the holder may be separated from the machine tool for measurement and may be clamped onto the machine tool again for the iteration of the process steps, which simplifies the method.

Since not all conceivable structures and geometries which are useful for optical arrangements of the type described here may be manufactured by way of turning, under certain circumstances one or more of the mentioned process steps may also be carried out by way of a milling tool which is then provided as a further component of the machine tool and can include a diamond as a cutting element.

The suggested method turns out to be particularly simple if the mentioned process steps are carried out by a tool of the machine tool which is the same for all mentioned process steps, since then one may avoid errors which otherwise may be caused by slight uncontrolled fluctuations of a relative position of different tools of the machine tool.

With typical designs of the method, the machine tool however comprises at least one turning tool as well as at least one milling tool, wherein the process steps for structuring the optical functional surfaces and the reference structure are then partly carried out by the at least one turning tool and partly by the at least one milling tool, which can each have a diamond as a cutting element. Thereby, the machining by way of the turning tool and the milling tool may be carried out in a successive or alternating manner with a fixed tool arrangement. With a machining by way of different tools—in particular by way of a milling tool and a turning tool—these different tools of the machine tool should of course be in a known and, in some examples, fixed positional relation to one another. However, it is also conceivable for a miller head of the milling tool to be designed in a movable manner relative to the cutting element of the turning tool, as long as, despite this, only the relative position of the one tool to the other is exactly known in each case.

In order to permit a measurement of the functional surfaces relative to the at least one reference structure, the latter may be designed such that they define at least one point and/or at least one line and/or at least one surface. For this, the reference structures may e.g. comprise or form at least one spherically concave surface and/or at least one cylinder-shaped surface, or be designed in a cross-like manner. The at least one reference structure may be manufactured with optical surface quality, in order to render possible an adequately exact measurement. By way of this, as the case may be, it may be designed such that it may be interferometrically measured together with at least one of the optical functional surfaces.

The reference structures should be designed such that the shape and/or position of at least one of functional surfaces relative to the reference structures with respect to one, two or, in some cases, all spatial directions and/or their orientation with respect to one, several or, in some cases, all spatial axes may be unambiguously determined by way of the reference structures. For this, e.g. two, three or up to six reference structures may be created.

For determining the deviation of the functional surfaces from the desired shape and desired position which are defined with respect to the reference structures, e.g. firstly the reference structures and then the optical functional surfaces may be measured in relation to the reference structures. Thereby, a position of a coordinate origin unambiguously defined with respect to the machine tool during the process steps may firstly be determined by way of the reference structures, so that then the optical functional surfaces may be measured in relation to the coordinate origin, thus the measured functional surfaces may be specified in a coordinate system with this coordinate origin. If the machine tool is a lathe or a turning tool, the coordinate origin may thereby be given e.g. by a point on the rotation axis and, in some cases, lie where the rotation axis goes through a surface of the optical arrangement.

BRIEF DESCRIPTION OF THE DRAWINGS

One embodiment of the invention is hereinafter explained by way of the FIGS. 1 to 7. Thereby are shown in:

FIG. 1 a cross section through a telescope as an example of an optical apparatus according to the invention, FIG. 2 a perspectively represented optical arrangement, which is a constituent of the telescope of FIG. 1, FIG. 3 in a corresponding representation, a constituent part of the optical arrangement of FIG. 2, FIG. 4 as a sectioned drawing, a detail of the optical arrangement of FIG. 2 at a location, at which this optical arrangement is connected to a support of the telescope of FIG. 1, FIG. 5 a perspective view of a machine tool, with which the optical functional surfaces of the optical arrangement of FIG. 2 are manufactured, FIG. 6 in a perspective representation, a measurement device for measuring these optical functional surfaces and FIG. 7 a diagram which illustrates how an optical quality of the optical arrangement may be improved by way of an iteration of process steps carried out with the machine tool and with measurements carried out by the measurement device.

DETAILED DESCRIPTION

Figure 1:
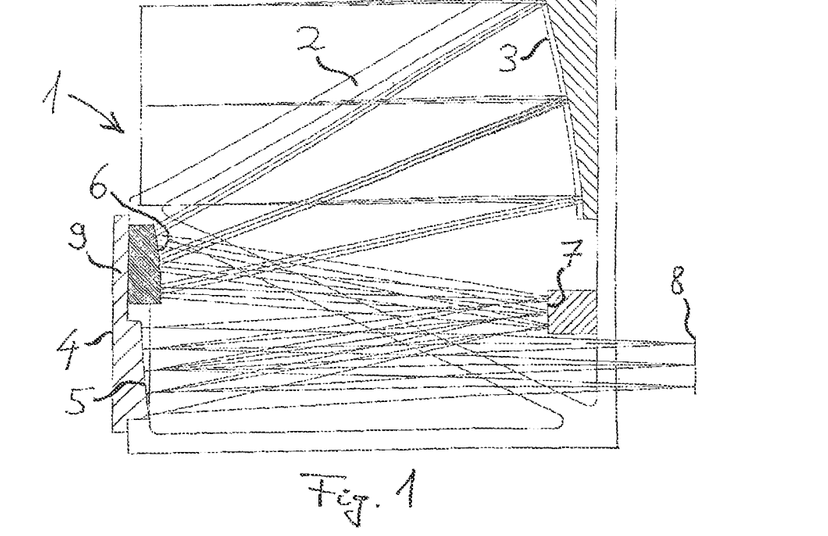

A telescope 1 is to be recognised in FIG. 1, with which it is the case of a mirror telescope with a beam path folded several times. This telescope 1 comprises a support 2 which is designed as a bar system and on which in particular a concave primary mirror 3, and at an opposite end an optical arrangement 4 is fastened.

Figure 2:
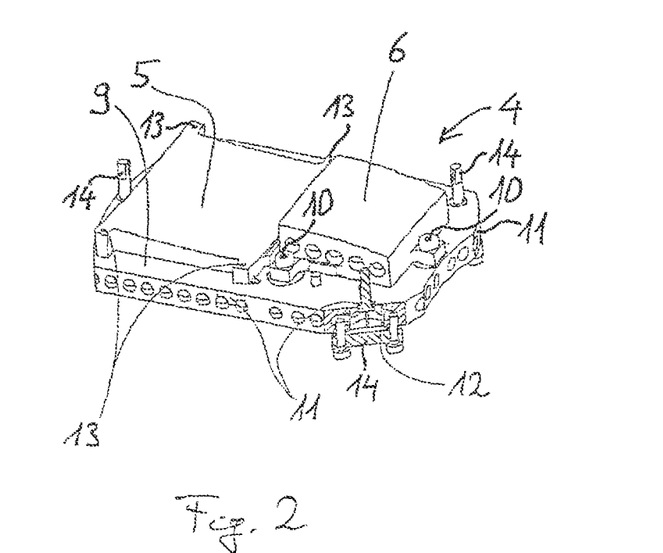

The optical arrangement 4 which is represented on its own in FIG. 2, comprises a first optical functional surface 5 and a second functional surface 6 arranged next to this. With regard to the second functional surface 6, it is the case of an aspherically convexly curved mirror which forms a secondary mirror of the telescope 1 whilst the first optical functional surface 5 is given by an aspherically concavely curved mirror, onto which light incident into the telescope 1 falls after a reflection on the primary mirror 3, after a second reflection on the function surface 6 and a after further reflection on a planar folding mirror 7. Thus a real picture arises in a picture plane 8 behind the first optical functional surface 5 in the beam path. The two optical functional surfaces 5 and 6 are arranged in a fixed positional relation to one another on a common metallic support structure 9. The first optical functional surface 5 with the present embodiment example is formed monolithically with the support structure 9, whilst the second optical functional surface 6 is formed by a surface of a further metallic carrier which is connected to the support structure 9 at three fastening points 10. With a modification of the represented design, of course also the first optical functional surface 5 could have an individual support and be placed onto the support structure 9. The optical functional surfaces 5 and 6 which each have a metallic mirror surface may also be shaped differently with modifications of the optical arrangement 4 described here. In particular, one of the functional surfaces 5 or 6 may also be given by a plane mirror.

The support structure 9 comprises several bearing-contact surfaces 11 which are manufactured with optical quality and on which the optical arrangement 4 bears at certain locations of the support 2 when it is built into the telescope. A position and orientation of the optical arrangement 4 in the telescope 1 is unambiguously fixed with such a high accuracy by way of this, that no further adjustment is necessary after an installation of the optical arrangement 4. In order to prevent the optical arrangement 4 from distorting when it is connected to the support 2, kinematic decouplings 12 are provided in an environment of three of the bearing-contact surfaces 11, at which the support structure 9 is connected to the support 2 in a fixed manner. Finally, four reference structures 13 are to be recognised in FIG. 2, with which in the present embodiment example it is each the case of a spherically concave surface of a very small diameter of about 1.5 mm, thus of a small depression or indentation, and these reference structures are arranged outside a quality region of the first optical functional surface 5 and in the present case span a square and each define a point, specifically the central and deepest point of the respective small depression.

Figure 3:
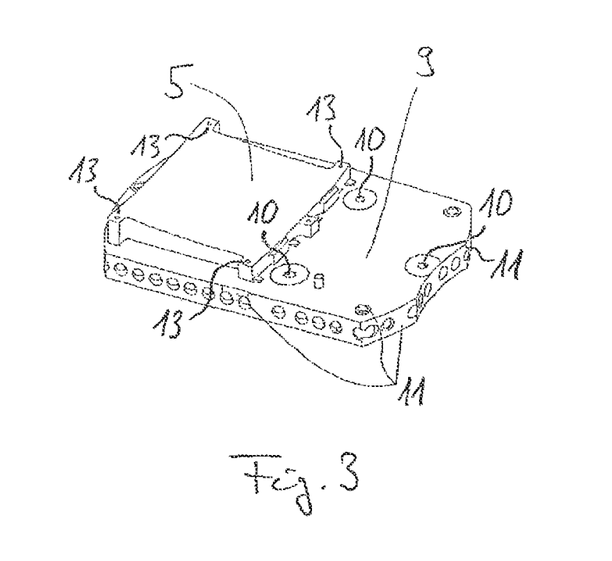

The support structure 9 with the first optical functional surface 5 is shown once again without the support of the second optical functional surface 6 in FIG. 3. Recurring features there are provided with the same reference numerals, as is the case in the remaining figures.

Figure 4:
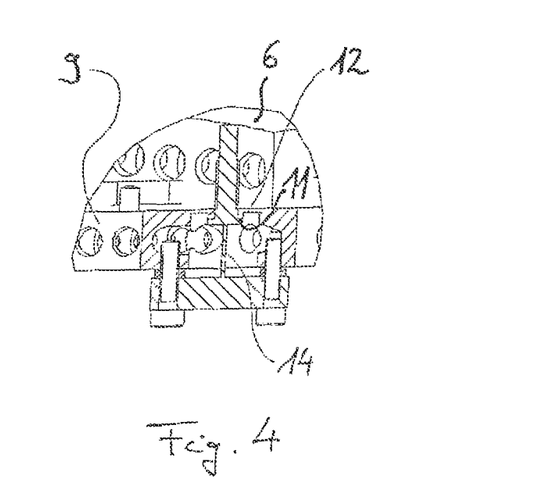

FIG. 4 as a sectioned drawing, shows a detail of the optical arrangement 4 which is also represented in a sectioned manner in FIG. 2. There, the kinematic decoupling 12 is to be recognised in a more precise manner, which is created monolithically with the support structure 9 and is designed as a membrane. This membrane connects one of the bearing surfaces 11 to a base body of the support structure 9. One of three axially fixed fastening elements 14 is to be recognised in FIG. 4 and this fastening element serves as an external reference for an exactly positioned fastening of the optical arrangement 4 and is to be understood as a releasable constituent of the support 2.

Figure 5:
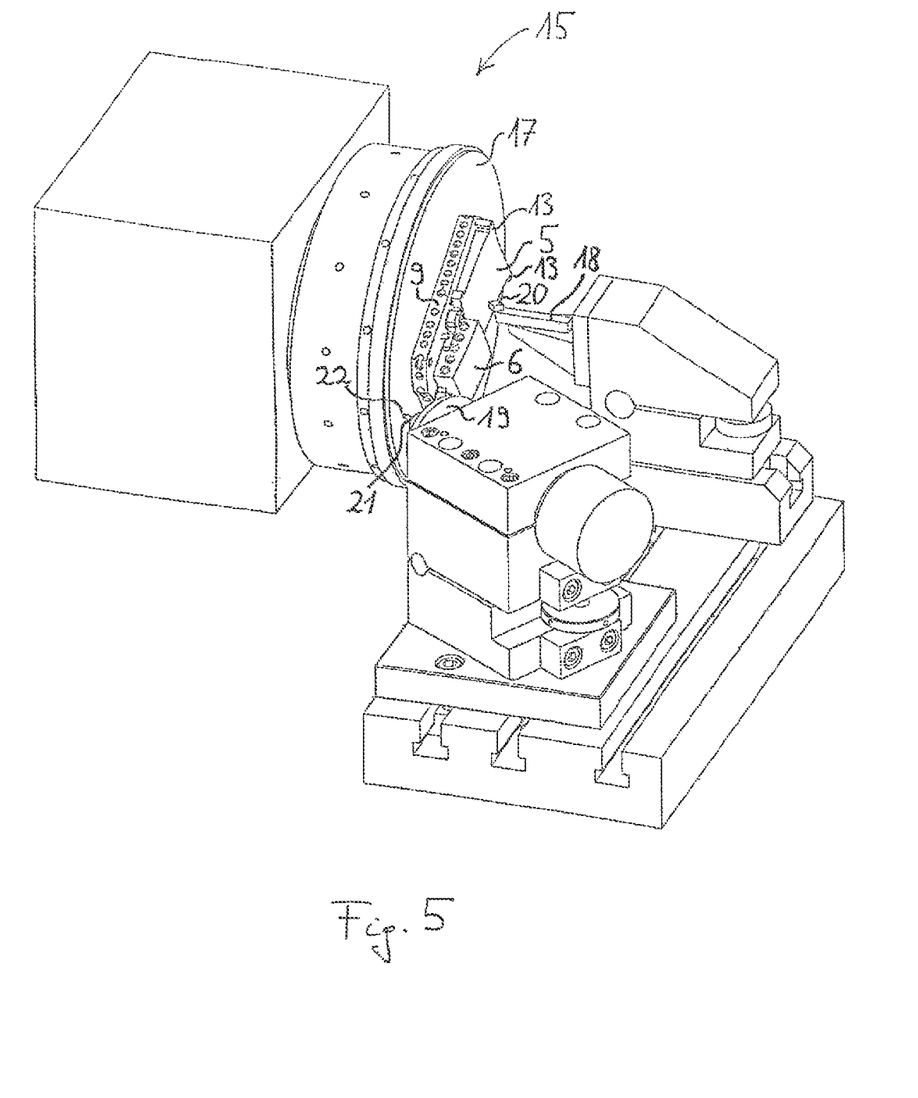
Figure 6:
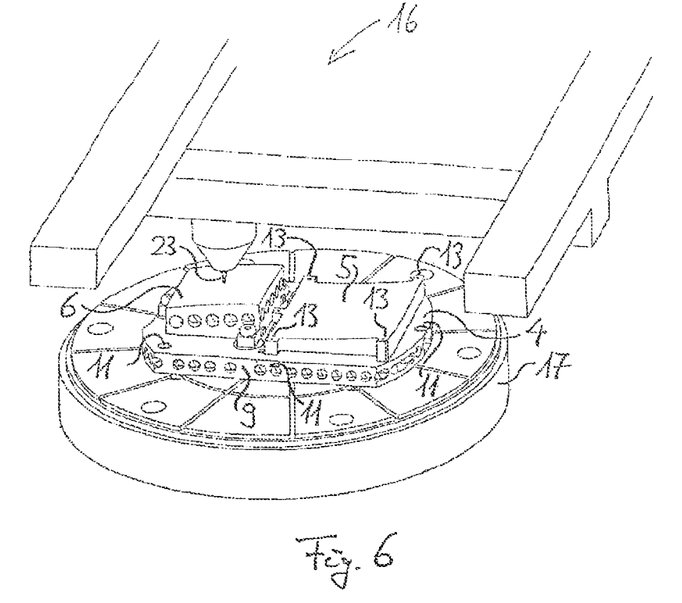

A device for manufacturing the optical arrangement 4 comprises a machine tool 15 shown in FIG. 5, for manufacturing the functional surfaces 5 and 6 and the reference structures 12, as well as a measuring device 16 which is arranged separated therefrom in the present embodiment example, for measuring the functional surfaces 5 and 5 and the reference structures 13 which are shown in FIG. 6. A holder 17 designed as a rotation disk is seated on a motorically driven shaft of the machine tool 15 and may be set into a rotation movement by way of this. Thereby, the machine tool 15 comprises a turning tool 18 and a milling tool 19. The turning tool 18 which comprises a diamond 20 as a cutting element may be moved to the holder 17 and away from it with the help of servomotors and specifically when required with a high speed or frequency, as well as be displaced radially to the rotation axis of the machine tool 15. The milling tool 19 comprises a milling head 21 which is likewise motorically displaceable in any direction, with a cutting element 22 which is likewise given by a diamond. The milling head 21 as well as the turning tool 18 may thereby be moved in a controlled manner relative to the holder 17 with an accuracy in the sub-micrometer range and with this are each located in an exactly controllable and, in some examples, fixed positional relation to one another. The measurement device 16 which with other embodiments could also be integrated into the machine tool 15, in the present embodiment is designed for a tactile measurement of the functional surfaces 5 and 6 and of the reference structures 13, and for this comprises a measurement pin 23 which may be led over the surfaces to be measured in a controlled manner, so that these may be scanned by way of this. A computation unit of the measurement device 16 which is not represented in FIG. 6, with regard to programming technology, is set up to determine a deviation of the optical functional surfaces 5 and 6 with respect to a desired shape and desired position which are defined relative to the reference structures 13. Additionally, it is set up to transform the thus determined deviation into a coordinate system which is defined by way of degrees of freedom of the machine tool and to compute corrected setting values for the machine tool 15, by way of which the determined compensation may be at least largely compensated with a further machining of the optical arrangement 4 by way of the machine tool 15.

Hereinafter it is described how the optical arrangement 4 is manufactured with the help of the machine tool 15 and the measurement device 16.

Firstly, the support structure 9 which is designed in a lightweight manner is cemented onto the holder 17, of which it is only released at the end of the manufacturing method.

Then, four different process steps are carried out by the machine tool 15, wherein the holder 17 with the support structure 9 remains clamped on the shaft of the machine tool 5 and by way of this remains connected to the machine tool 15 in a fixed manner, until the completion of these process steps. Thereby, in a first process step, the first optical functional surface 5 is manufactured by way of the turning tool 18 from a blank formed by the support structure 9 and thereby obtains a shape which is defined by the activation of the machine tool 15. The support of the second optical functional surface 6 as a further blank is then put onto the support structure 9 and is joined together with this at the fastening points 10. The second optical functional surface 6 is then manufactured from the further blank in a second process step again by way of the turning tool 18 and specifically with a shape and with a relative position to the first functional surface 5, which is again defined by the activation of the machine tool 15. In a third process step which may also be carried out before the second process step, the reference structures 13 are manufactured on the blank formed by the support structure 9, with a defined and measurable relative position to the optical functional surfaces 5 and 6, by way of the milling tool 19. In a farther process step, the bearing-contact surfaces 11 are formed with the milling tool 19 and under certain circumstances partly also with the turning tool 18, of which bearing-contact surfaces three come to bear on the membranes of the kinematic decouplings 12.

Alternatively or additionally to be membranes, the kinematic decouplings 12 could also be designed with other solid body joints and for this may e.g. comprise webs or be designed as a bar system. The optical functional surfaces 5 and 6 with their manufacture are rotated with the turning tool 18 about a common axis which is given by the axis of the machine tool 15. The four described process steps may however also be carried out in a different sequence and under certain circumstances also partly simultaneously. With the described process steps, one may additionally also manufacture other structures on the support structure 9 or on the further blank, for example optical grids or bearing-contact structures for the support of the second optical functional surface 6 around the fastening points 10. It would also be conceivable for the blank for the first optical functional surface not to be formed by the support structure 9 itself but, similarly to the support of the second optical functional surface 6, by a separate component which is joined onto the support structure 9 in a suitable manner. With other embodiments of the method, in particular with a different geometry of the optical arrangement 4, the mentioned process steps may also be carried out by a tool of the machine tool 15 which is the same for all process steps, for example exclusively by the milling tool 19. Instead of four reference structures 13 which are provide in the present embodiment example, one may also provide differently shaped reference structures, for example those which in each case define a line or surface. Such a reference structure could e.g. also be formed by a cylinder-shaped surface. Depending on how the reference structures 13 are shaped, these may also be provided in different numbers, so that under certain circumstances also only two or three or also e.g. up to six reference structures 13 may be manufactured in the outlined third process step. In any case, the reference structures 13 which could be provided alternatively or additionally also on the support of the second optical functional surface 6, are designed such that they span a coordinate system, with respect to which the shape, position and orientation of the optical functional surfaces 5 and 6 may be unambiguously defined.

After the described process steps which are carried out with the machine tool 15, the shape and the position of the optical functional surfaces 5 and 6 on the carrier structure 9 relative to the reference structures 13 are measured with the measurement device 16, wherein a deviation of the optical functional surfaces 5 and 6 from a desired shape and a desired position which are exactly defined relative to the reference structures 13, is determined. For this, the holder 17 with the support structure 9 is removed from the shaft of the machine tool 15, and, as is shown in FIG. 6, is placed in the measurement device 16. On measuring the reference structures 12 and the functional surfaces 5 and 6, a deviation of the bearing surfaces 11 and, as the case may be, of further structures, from a desired shape and desired position relative to the reference structures is determined. In the present embodiment example, the measurement is effected in a tactile manner, by way of the measuring pin 23 of the measurement device 16 being led over the surface to be measured. With other embodiments, the reference structures 13 and the optical functional surfaces 5 and 6, alternatively or additionally may also be measured interferometrically for determining the mentioned deviation. This is possible by way of not only the optical functional surfaces 5 and 6, but also the reference structures 13—as also the bearing surfaces 11—being manufactured with optical surface quality.

For determining the deviation of the optical functional surfaces 5 and 6 from their desired shape and desired position, firstly the reference structures 13 are measured in the measurement device 16, thus the positions of these reference structures are determined, whereupon the optical functional surfaces 5 and 6 are measured in relation to these reference structures 13. Thereby, again firstly with the help of the measured reference structures 13, a location of the coordinate origin is determined and in the present embodiment example this coordinate origin is selected such that it lies on the rotation axis of the machine tool 15, more precisely where this rotation axis goes through a surface of the optical arrangement 4. This rotation point and coordinate origin in the present embodiment example may be located in a very simple manner by way of the fact that it lies exactly between two of the our reference structures 13, whilst the other two reference structures 13 lie on a larger circle with a middle point defined by the mentioned rotation point and coordinate origin. The coordinates of the measured optical functional surfaces 5 and 6 as well as bearing-contact surfaces 11 are then specified in a coordinate system with this coordinate origin. Since the reference structures are manufactured by the machine tool 15, with regard to this coordinate system, it is the case of a system which has a defined position with respect to the machine tool 15 when the holder 17 is connected again to the machine tool. Thus in the described manner, the machine coordinate system of the machine tool 15 is found again in the—for the time being semi-finished—optical arrangement, which permits the mentioned deviation of the shape and position of the optic a functional surfaces 5 and 6 to be determined not only relative to the reference structures 13, but with this also relative to the machine tool 15. For this reason, errors of the shape as well as of the position and in particular of the relative position of the functional surfaces 5 and 6 to one another may be drastically reduced by the subsequently described measures. In some examples, the mentioned coordinate system, in which the deviation from the desired shape and the desired position is determined, is moreover orientated such that a coordinate axis corresponds to the rotation axis which in turn corresponds to a degree of freedom of the movable turning tool 18 and of the milling head 19.

After the described process steps are carried out a first time and the functional surfaces 5 and 6 as well as the bearing surfaces 11 are measured a first time, the four described process steps are repeated at least once, and specifically with an activation of the machine tool 15 which us changed in a manner such that the deviation determined on measurement is reduced. The evaluation of the deviation by the measurement device 16 and the subsequent repetition of the process steps with an activation of the machine tool 15 which is changed in dependence on the measured deviation, may hereby be effected successively several times, until the deviation remaining at the end falls below a defined tolerance in the sub-micrometer range by way of this iteration.

Figure 7:
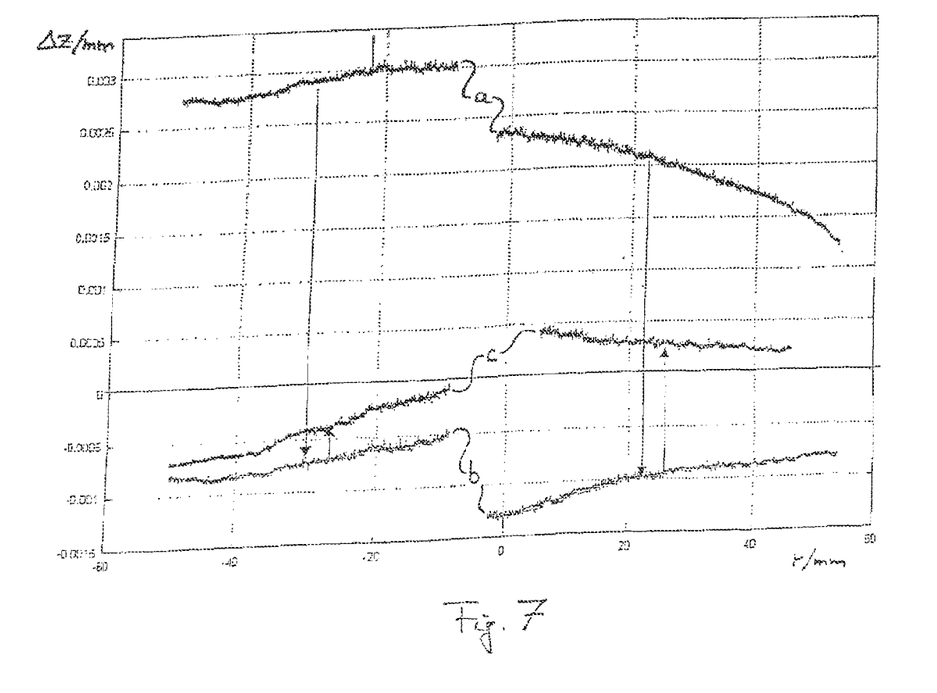

In FIG. 7 one may recognise that already with very few iteration steps, one may achieve an extraordinary high accuracy by way of this, and specifically with respect to the shape of the optical functional surfaces 5 and 6 as well as with respect to their relative position to one another. There, a deviation $\Delta z$ of the functional surfaces 5 and 6 which are measured after carrying out the mentioned process steps for the first time, with respect to an ideal surface is indicated at a, for a section through the functional surfaces 5 and 6 which runs through the coordinate origin. The respective result of a second measurement after a second implementation of the process steps with a changed activation of the machine tool 15 is indicted at b in the same figure. In this example, the correction of the activation for the second run of the process steps has evidently turned out to be too large, which is why the activation is slightly changed once again. The values for the deviation Δz which are indicated in FIG. 7 at c, then result after a third run of the process steps and this deviation lies completely in the sub-micrometer range.

The invention claimed is:

1. A method for manufacturing an optical arrangement with at least two optical functional surfaces of a defined shape which are arranged on a common support structure in a fixed positional relation to one another, comprising:
   in a first process step, by way of a machine tool, a first optical functional surface with a shape defined by an activation of a machine tool is manufactured from a blank which is at least one of formed by the support structure and arranged on the support structure,
   in a second process step, by way of the machine tool, at least one second optical functional surface with a shape defined by the activation of the machine tool and with a defined relative position to the first functional surface is manufactured from at least one of the mentioned blank and a further blank which is arranged in the support structure, and
   in a third process step, by way of the machine tool, at least one reference structure with a defined and measurable relative position to the optical functional surfaces is at least one of manufactured upon the support structure, manufactured on the support structure, manufactured on the blank and manufactured on the further blank,
   wherein the support structure remains fixedly connected to the machine tool until completion of the mentioned three process steps which may be carried out in at least one of a temporal sequence and simultaneously; and
   wherein subsequently the shape and the position of the at least two optical functional surfaces on the support structure relative to the at least one reference structure is measured in a measurement construction and a deviation of the optical functional surfaces from a desired shape or desired position, which is defined in an exact manner relative to the at least one reference structure, is determined,
   wherein the mentioned three process steps are repeated at least once with an activation of the machine tool which is changed in a manner such that the mentioned deviation is reduced.

2. The method according to the preceding claim 1, wherein the determining of the deviation and the subsequent repetition of the three mentioned process steps with a changed activation of the machine tool is effected several times in a deterministic manner, until the remaining deviation drops below a defined tolerance.

3. The method according to claim 1, wherein at least one of the blank and the further blank is arranged on the support structure connected to the machine tool only after the beginning or completion of at least one of the mentioned process steps.

4. The method according to claim 1, wherein one of the mentioned process steps is carried out by a turning tool of the machine tool which comprises a diamond as a cutting element.

5. The method according to claim 1, wherein at least one of the mentioned process steps is carried out by a milling tool of the machine tool which has a diamond as a cutting element.

6. The method according to claim 1, wherein the process steps for structuring the optical functional surfaces and the at least one reference structure are partly carried out with at least one turning tool and partly with at least one milling tool of the machine tool which each have a diamond as a cutting element, wherein the machining by way of the turning tool and the milling tool are carried out at least one of successively and alternatingly in a fixed tool arrangement.

7. The method according to claim 1, wherein at least one of the optical functional surfaces is a mirror with a metallic mirror surface.

8. The method according to claim 1, wherein the optical functional surfaces are at least one of shaped in a planar manner; shaped in a concave manner; shaped in a convex manner; shaped in a free manner; and formed with a combination of such shapes.

9. The method according to claim 1, wherein the at least one reference structure at least one of defines at least one point; defines at least one line; defines at least one surface; comprises at least one spherically concave surface; forms at least one spherically concave surface; comprises at least one cylinder-shaped surface; forms at least one cylinder-shaped surface; and is designed in a cross-shaped manner.

10. The method according to claim 1, wherein at least one of the at least one reference structure and the optical functional surfaces are measured in at least one of a tactile manner; measured in an interferometric manner; and measured by way of imaging optics, for determining the mentioned deviation.

11. The method according to claim 1, wherein the at least one reference structure is at least one of manufactured with optical surface quality and manufactured such that together with at least one of the optical function surfaces it may be measured interferometrically.

12. The method according to claim 1, wherein two, three or up to six reference structures are manufactured.

13. The method according to claim 1, wherein at least two of the optical functional surfaces have a common rotation axis, about which the support structure is rotated in the machine tool for manufacturing these functional surfaces.

14. The method according to claim 1, wherein firstly the reference structures are measured and then the optical functional surfaces are measured in relation to the reference structures, for determining the deviation.

15. The method according to claim 1, wherein by means of the reference structures, firstly a position of a coordinate origin is determined, which during the process steps is unambiguously defined with respect to the machine tool, and then the optical functional surfaces are measured in relation to the coordinate origin.

16. An optical apparatus, comprising an optical arrangement which is manufactured by a method according to claim 1.

17. The optical apparatus according to claim 16, wherein a position and orientation of the optical arrangement in the optical apparatus is fixed by way of at least one bearing-contact geometry, which as a further structure of the optical arrangement is manufactured with optical precision and with which the optical arrangement bears on a support of the optical apparatus.

18. The optical apparatus according to claim 16, wherein it is a telescope.

19. A device for carrying out a method according to claim 1, comprising:
   a machine tool for manufacturing the at least two functional surfaces and the at least one reference structure, and a measurement device which is one of arranged separate from the machine tool and integrated in the machine tool, for measuring the functional surfaces and the at least one reference structure, wherein the measurement device with regard to programming technology is set up to determine the deviation of the optical functional surfaces compared to a desired shape and desired position which are defined relative to the at least one reference structure and to at least one of (i) transform the determined deviation into a coordinate system defined by degrees of freedom of the machine tool and (ii) compute corrected setting values for the machine tool by way of which the deviation may be at least largely compensated by repeating at least one of the first, second and third process steps.

20. A method for manufacturing an optical apparatus including an optical arrangement with at least two optical functional surfaces of a defined shape which are arranged on a common support structure in a fixed positional relation to one another, the method comprising:

manufacturing the optical arrangement using the method of claim 1, wherein, by way of the machine tool, at least one further structure is manufactured on the support structure in addition to the optical functional surfaces and the at least one reference structure, a deviation of the at least one further structure from a desired shape and a desired position relative to the at least one reference structure being determined on measurement, wherein the further structure forms a bearing-contact geometry, the optical arrangement being mounted on a support of the optical apparatus such that the support structure is bearing on the bearing-contact geometry and that a position and orientation of the optical arrangement in the optical apparatus is fixed by way of the at least one bearing-contact geometry with respect to at least one degree of freedom.

21. The method of claim 20, wherein the at least one further structure is formed on a kinematic decoupling which is provided on or in the support structure.

* * * * *